(12) United States Patent
Ristanovic

(10) Patent No.: US 10,112,679 B2
(45) Date of Patent: Oct. 30, 2018

(54) BICYCLE WITH SUPPORT DEVICE

(71) Applicant: Bojan Ristanovic, Auckland (NZ)

(72) Inventor: Bojan Ristanovic, Auckland (NZ)

( * ) Notice: Subject to any disclaimer, the term of this patent is extended or adjusted under 35 U.S.C. 154(b) by 0 days.

(21) Appl. No.: 15/439,614

(22) Filed: Feb. 22, 2017

(65) Prior Publication Data

US 2017/0253293 A1 Sep. 7, 2017

Related U.S. Application Data

(60) Provisional application No. 62/301,744, filed on Mar. 1, 2016.

(51) Int. Cl.
| | |
|---|---|
| *B62M 1/00* | (2010.01) |
| *B62M 1/12* | (2006.01) |
| *B62M 1/36* | (2013.01) |
| *B62J 1/00* | (2006.01) |
| *B62M 9/02* | (2006.01) |
| *B62K 21/18* | (2006.01) |

(52) U.S. Cl.
CPC .............. *B62M 1/12* (2013.01); *B62J 1/007* (2013.01); *B62K 21/18* (2013.01); *B62M 1/36* (2013.01); *B62M 9/02* (2013.01)

(58) Field of Classification Search
CPC ............ B62M 1/12; B62M 1/14; B62J 1/007
USPC .............................................. 280/230, 242.1
See application file for complete search history.

(56) References Cited

U.S. PATENT DOCUMENTS

| | | | |
|---|---|---|---|
| 551,814 A | 12/1895 | East | |
| 559,244 A | 4/1896 | Williams | |
| 564,099 A | 7/1896 | Pritchett | |
| 575,787 A | 1/1897 | Voitek | |
| 578,027 A | 3/1897 | Rogers | |
| 585,370 A * | 6/1897 | Trickler | 280/234 |
| 595,501 A | 12/1897 | Stoops | |
| 597,348 A | 1/1898 | Winters | |
| 684,821 A | 10/1901 | Hood | |
| 1,149,422 A * | 8/1915 | Clark et al. | B62M 23/00 |
| | | | 280/230 |
| 2,229,778 A | 1/1941 | Taulbee | |
| 3,193,305 A | 7/1965 | Hendricks | |
| 3,701,543 A * | 10/1972 | Clark | B62M 1/14 |
| | | | 280/234 |
| 3,823,959 A | 7/1974 | Winters | |
| 4,773,662 A | 9/1988 | Phillips | |
| 4,858,942 A | 8/1989 | Rodriguez | |
| 5,326,122 A | 7/1994 | Duffy | |
| 5,383,677 A | 1/1995 | Thomas et al. | |
| 5,385,359 A | 1/1995 | Ehrbar | |
| 5,816,598 A | 10/1998 | Dodakian | |
| 5,820,151 A | 10/1998 | Cheng | |
| 6,076,846 A | 6/2000 | Clardy | |
| 6,098,493 A | 8/2000 | Cortes | |
| 6,099,009 A | 8/2000 | Schroeder | |

(Continued)

*Primary Examiner* — Tony H Winner

(57) ABSTRACT

Invention relates to the type of two wheel velocipede where the propulsion to the rear wheel is achieved by the use of riders legs/feet and propulsion to the front wheel is achieved by the use of riders arms and upper body on cranks that travel in circular motion using a single chain as a means to transfer force to the front wheel.
An innovative step is the chest and upper body support pad which enables the rider to relieve strain of the back muscles and provide a surface against which to pull the handlebars.

1 Claim, 4 Drawing Sheets

(56) References Cited

U.S. PATENT DOCUMENTS 6,264,224 B1 7/2001 Phillips
2010/0176571 A1 7/2010 Mashian \* cited by examiner

BICYCLE WITH SUPPORT DEVICE

Claims priority date of a prior provisional application 62/301,744

FIELD OF INVENTION

The invention relates in general to bicycles.

BACKGROUND OF THE INVENTION

Although there are many variations of the cycle where the drive to the device can be achieved by the use of arms, most of the previous inventions have pitfalls which make them rarely practical and some are overly complex in design making them commercially unappealing.

Here we will focus on designs where front wheel is propelled by the use of riders arms and upper body via handlebar cranks and crank wheel which are moving in a complete circular motion.

Designs where the arm propelled handlebar cranks are oriented 180 degrees relative to one other (as usually seen in leg powered devices) provide a good resistance for arms relative to one other so that the riders body can maintain in a consistent position in relation to the vehicle. However a very serious drawback of this design is that the steering function of the handlebars is severely compromised and steering becomes impossible and very dangerous should the rider try to do so at the moment when the crank arms are in a vertical position of their rotating cycle. In this position the vehicle becomes very unstable and any attempt to control it becomes counter intuitive and can generally result in a crash. The steering of the bicycles with the said 180 degree handlebar crank orientation is possible only in those moments when one crank is forward and the other backward, them both being aligned on a horizontal plane. (patents: U.S. Pat. No. 4,858,942, U.S. Pat. No. 564,099, U.S. Pat. No. 5,816,598, U.S. Pat. No. 597,348, U.S. Pat. No. 3,823,959)

One way to avoid this instability is to orient the opposing handlebar crank arms at 0 degrees relative to one another, so that the forces from the riders arms are always equal on both sides. This makes steering easy and the vehicle very stable.

However this introduces a new problem in itself. In this design as the rider pedals with their arms the rider does so in a circular motion where for the half of the stoke the rider is pushing the handlebar away from himself and for the other half of the motion he/she is pulling it towards himself/herself. When the rider uses the pushing motion he/she is also involuntarily pushing back their entire body in the opposite direction due to forces of action/reaction. The tendency for the body to move backwards in this part of stroke is generally resisted by the seat where the rider is resting most of his/her weight.

However when the rider is doing the second half of the stroke, and starts to PULL the handlebar towards their body, the rider's mass has a tendency to fly forward in reaction due to the same laws of physics.

This event causes an unpleasant feeling as the rider is swung severely over the handlebars and is also inefficient as the body keeps moving back and forth subsequently causing unnecessary opposing forces to travel through the bicycle and results in slowing the bicycle down on each half the stroke. It becomes an inefficient way to propel the bicycle with energy being wasted and the whole experience feeling uncomfortable. (patents: U.S. Pat. No. 3,193,305, U.S. Pat. No. 6,099,009, U.S. Pat. No. 595,501, US20100176571, U.S. Pat. No. 4,773,662, U.S. Pat. No. 6,264,224)

So something needs to be put in place that is secured to the bicycle and that the rider can pull against on the other half of the stroke.

Some previous standard bicycle designs (leg driven only) utilise a form of a pad solely as a means of a support for the rider to alleviate stress on arms and back. However all previous inventions are positioned in such a way which is undesirable to the function of the bicycle especially where the arms are also used for propulsion.

If the pad is positioned forward of the fork steerer tube (patents: U.S. Pat. No. 5,385,359, U.S. Pat. No. 6,098,493, U.S. Pat. No. 559,244, U.S. Pat. No. 5,326,122, U.S. Pat. No. 575,787, U.S. Pat. No. 2,229,778, U.S. Pat. No. 578,027) then putting the force of rider's weight against it can result in additional unwanted steering instability as the force is applied to the handlebars and exaggerated by the means of a lever when the bars are turned which could also counter the intended steering direction of the arms.

Positioning of the pad or support device on the frame's top tube, frame's down tube, seat post or any position behind the fork steerer tube (patents: U.S. Pat. No. 6,076,846, U.S. Pat. No. 5,383,677) is often not practical as it interferes with other desired functions of the rider such as cycling standing up. These mounting positions also don't provide any support to the bicycle's steering which means the arms must always be used on the handlebars. Dismounting the bicycle also becomes more difficult. These positions are also not in line with the current safety standards.

U.S. Pat. No. 5,820,151 shows some form of a pad (although it doesn't specify such in the claims), but the pad assembly relates to this specific design of bike and is mounted to a horizontal member which is clamped by a rear facing stem. This type of design is not practical as such stems are not used in conventional bikes and also the pads adjust-ability is severely limited as the length of the support posts to the pad is fixed. Using such a design is also not practical from a manufacturing view point as it can not be used with current existing fork steerers which are generally tubular and would require many specially made parts but is still unable to provide the desired function for use with hand driven cycles.

U.S. Pat. No. 684,821 and U.S. Pat. No. 551,814 show a form of shoulder braces which go a specific height to riders shoulders and are attached to the fork with intended function being the steering of the bicycle. However the described devices are not practical for manufacture and not practical for use on the current bicycle and invention described herein and would not solve the problems discussed previously. Their positioning, shape and where they contact the rider do not provide the sufficient resistance and support necessary for a hand propelled cycle described by the invention herein. Also the propulsion of these devices is to the rear wheel.

BRIEF SUMMARY OF THE INVENTION

The object of the invention is to provide a cycle with a support pad device which the rider can pull against in one part of the stroke but not have an adverse affect on steering as well as providing stress alleviation for the back of the rider and allowing use the arms for propulsion, maneuvering and operating of other controls as rider is able to temporarily remove hands from handlebars using the support pad to stabilise the steering.

The innovative step is the support pad which is mounted to the upper part of the fork steerer tube against which the rider can rest his chest and upper body.

The invention can also be used on any conventional leg powered bicycle as a means to alleviate back stress and reduce injury to the rider. By putting some or most of the riders upper weight onto the pad support device the stress on the riders wrists and hands is greatly reduced making for a more comfortable ride and reduced chance of injury.

DETAILED DESCRIPTION OF THE INVENTION AND PREFERRED EMBODIMENTS OF

Figure 1:
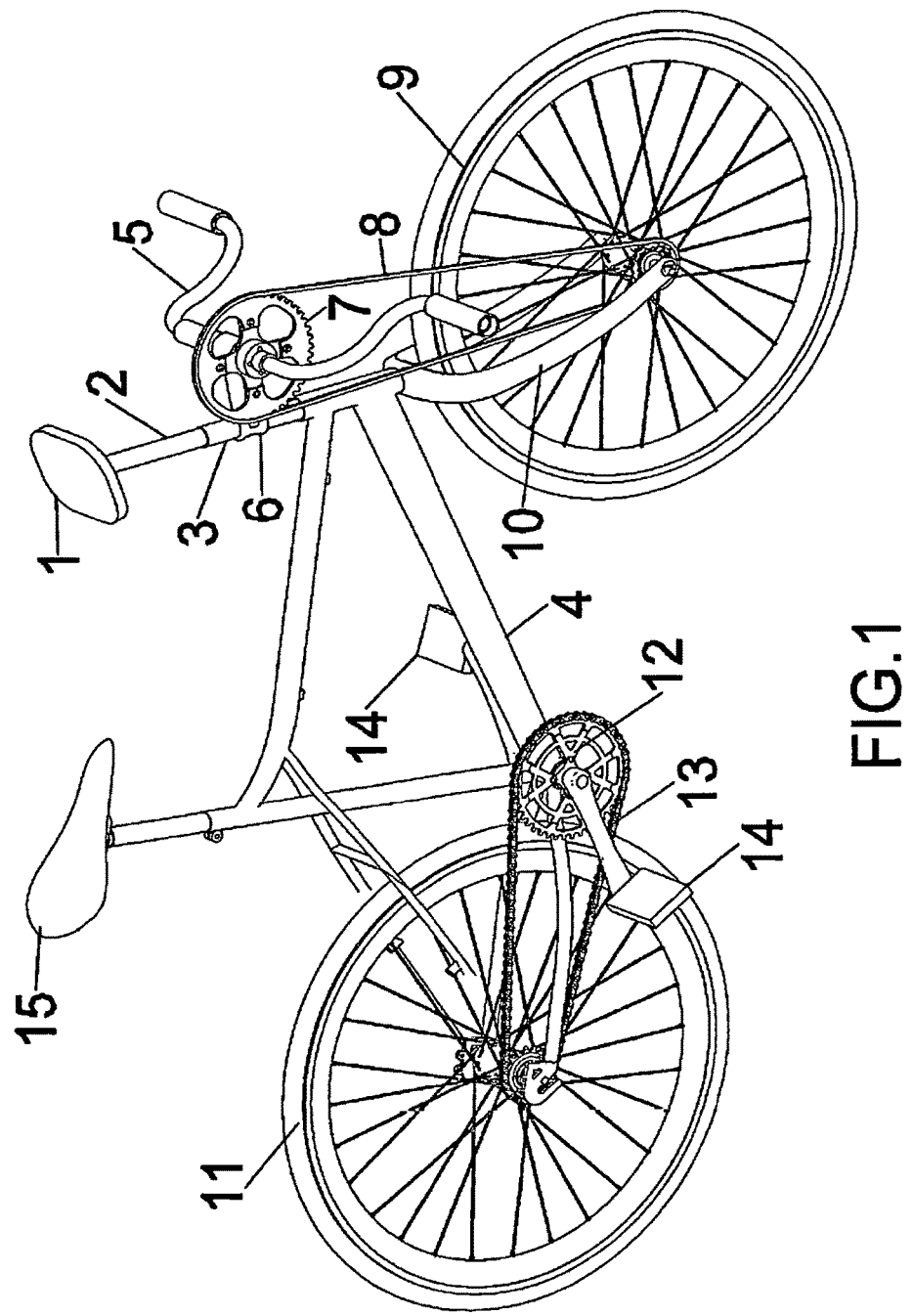
FIG. 1 is the perspective view of the bicycle embodying the invention.
Figure 2:
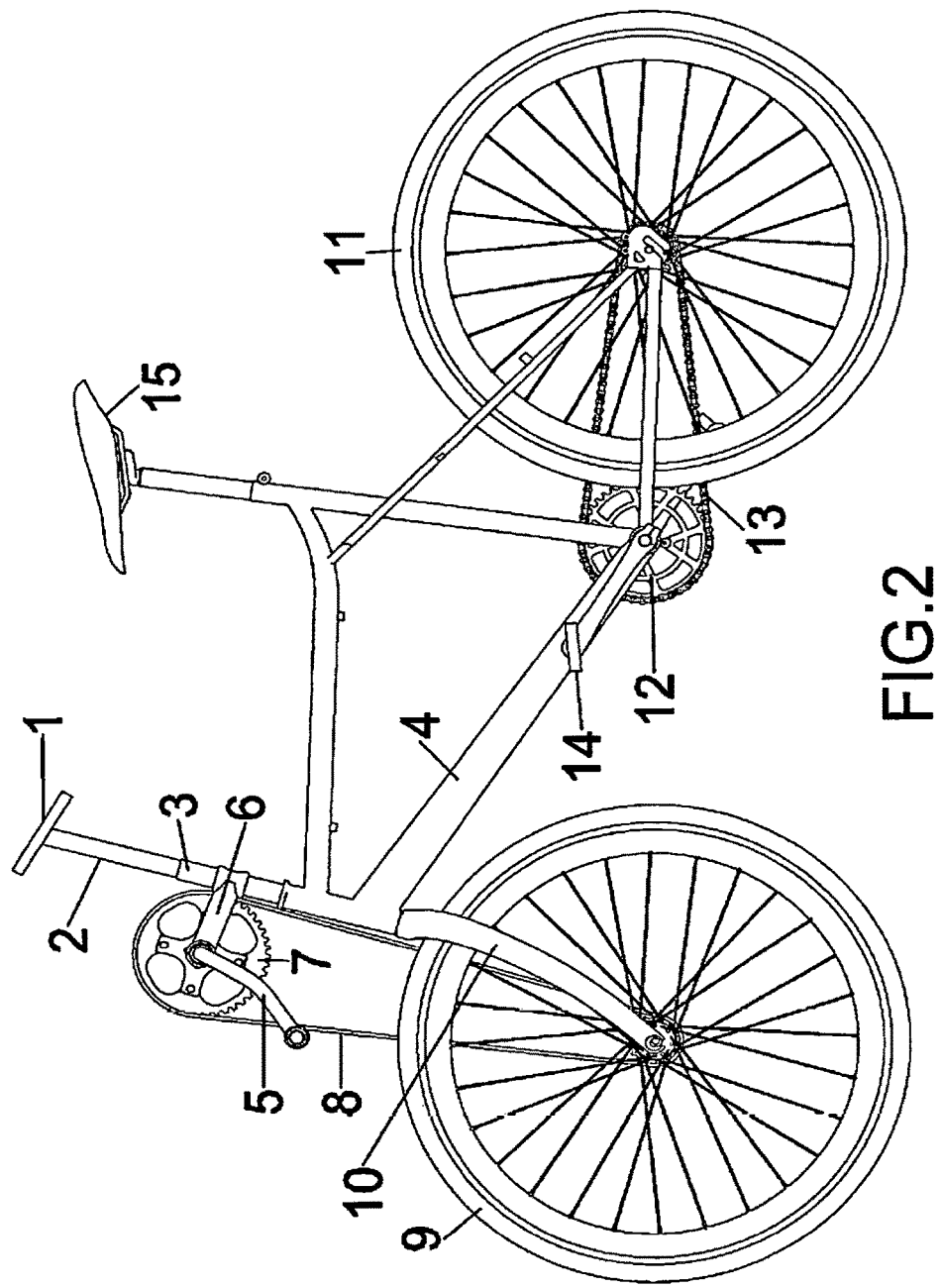
FIG. 2 is the side view of the bicycle embodying the invention.

The bicycle has a frame, indicated by the numeral 4, a fork 10 which includes a fork steerer tube 3, front wheel 9, rear wheel 11, stem 6, rear sprocket 12, rear chain 13, foot pedals 14 and seat 15 which are assembled in a standard and usual way comprising a bicycle. The elements thus far described are all conventional and well known and need not be described in further detail.

Handlebar 5 is rotatably connected to stem 6 which has a bearing surface. Front sprocket 7 is attached to handlebar 5 and as it's set into circular motion transfers force to front chain/belt 8 which then drives the front wheel 9.

Rider rests his upper body on support pad 1.

Preferably the support pad 1 can have a protruding post 2 (either mounted to or be a single unit with the support pad 1) and where the said post 2 extends downwards and into the steerer tube 3 of the fork 10.

In one example as the steerer tube 3 is usually hollow, the post 2 can fit inside it. This is made possible in recent past by the use of new "thread-less fork" systems which use a separate stem to mount the handlebars to the steerer fork, leaving the hollow top of the steerer fork empty and accessible.

Figure 3:
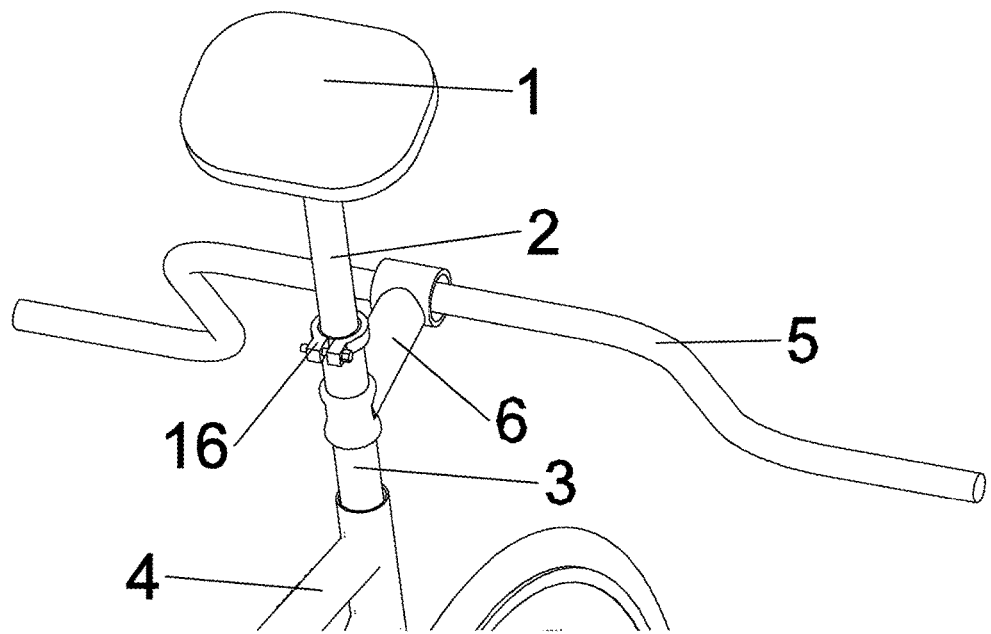
FIG. 3 is a fragmentary perspective view on an enlarged scale showing the invention and one example of how it fits inside the fork steerer tube.

Preferably the version of the support pad 1 that uses a post 2 which inserts into the fork steerer tube 3 can be further secured including but not limited to means of clamping, bolting, clipping in or anchoring to name a few. Referring to FIG. 3, one example would be to use a clamp 16 (as usually used to secure a bicycle seat post to the frame) to clamp down on the fork steerer tube 3, compressing it and therefore clamping down on the post 2, securing it in place. The fork steerer tube 3 may have a small slit lengthways (not visible) where the clamp 16 attaches to aid in compression.

Another version would have the support pad post be a tube whose inside diameter is larger than the outside diameter of the fork steerer tube therefore fitting over the fork steerer tube and may also be further secured to it by the means of a conventional clamp.

Figure 6:
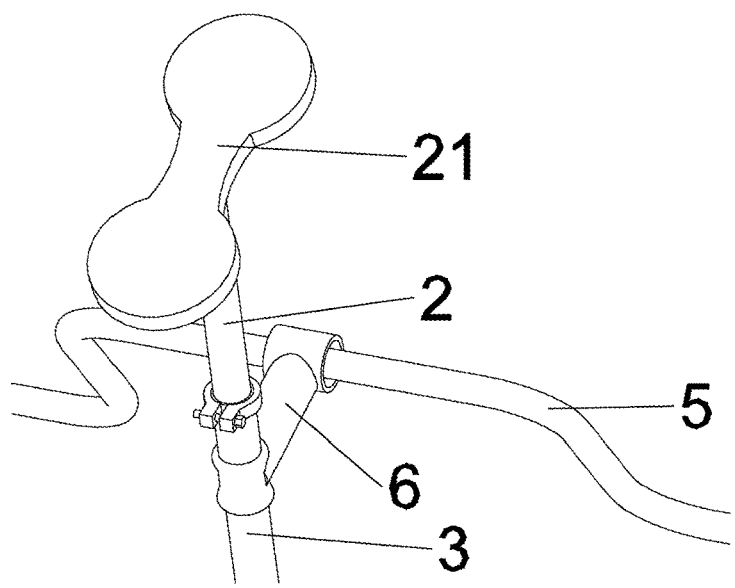
FIG. 6 is a fragmentary perspective view on an enlarged scale and shows an example of an alternative support pad shape.

Support pad 1 may be of a simple rectangular or rounded shape or be anatomically shaped to better fit the rider's body as well as be of a different shape to better conform to female anatomy which may mean being more elongated and narrow and some versions may be in a shape resembling a figure of eight pad 21 as shown in FIG. 6.

Figure 5:
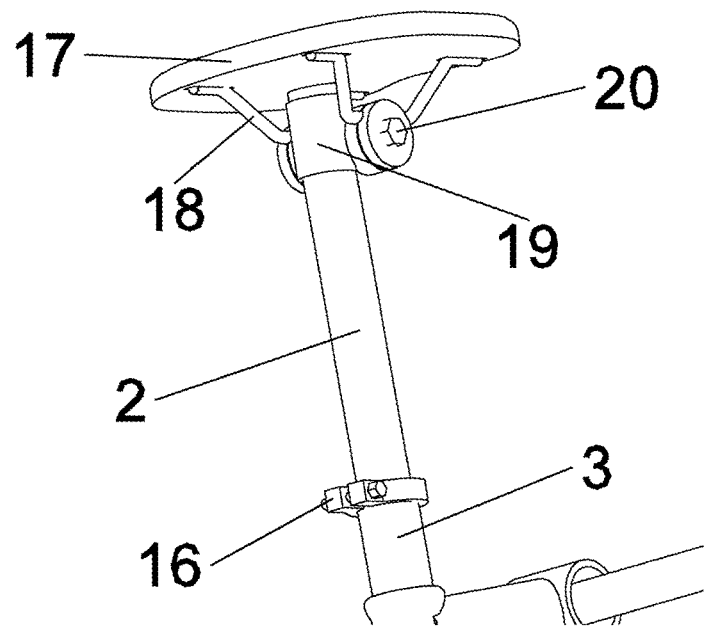
FIG. 5 is a fragmentary perspective view on an enlarged scale and shows an example of alternative means of connecting the support pad.

Referring to FIG. 5 shows another example of an alternatively shaped support pad 17 which encompasses support struts 18. Support struts 18 are secured by post clamp 19 which also secures to post 2. When bolt 20 is tightened it compresses post clamp 19 and in turn grips onto support struts 18 and post 2 simultaneously. The post clamp 19 may allow for adjust-ability of support pad 17 angle.

Figure 4:
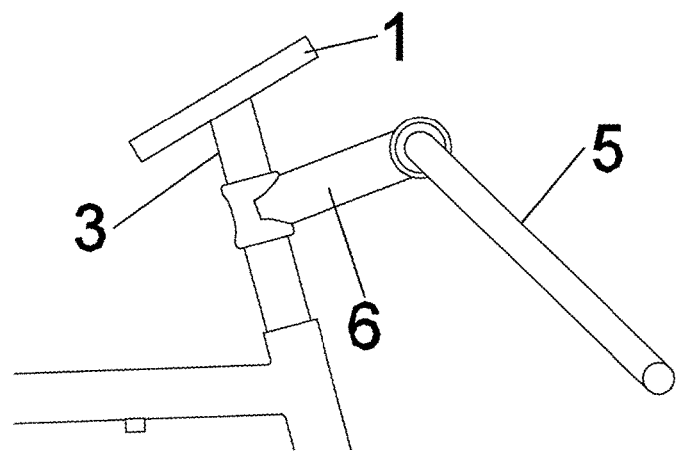
FIG. 4 is a fragmentary side view on an enlarged scale and shows an alternative positioning of a support pad directly to the fork steerer tube.

Referring to FIG. 4 the support pad 1 can also be mounted to the fork steerer tube 3 directly by various conventional methods including but not limited to adhesion, clamping or welding, removing the need to have a post 2 to connect the two.

Another version could make use of a star nut (not illustrated) (which is usually found inside the fork steerer tube on most modern thread-less fork designs) which would act as an anchoring device to which a bolt would be threaded and the same said bolt would be secured to the support pad or post.

A further version could have the bottom of the support pad post 2 cut at an angle (not illustrated) and using a nut also cut at the same angle so when the two are fastened towards each other by the means of a bolt they would create opposing side forces which would then expand outwards and onto the inside walls of the steerer tube. This is a conventional system used in the older bike designs to secure the older stem version into the fork steerer tube.

Mounting the support pad 1 to the fork steerer tube 3 as opposed to mounting it in the top tube of the frame, down tube of the frame, seat post, handlebars or other bicycle parts has advantages in that it is in the exactly right position to avoid applying forces in an undesirable way on the bicycle.

By placing the support pad 1 and it's mounting post 2 directly in line with the steerer tube 3, the riders weight and subsequent forces are applied directly to the axis of the front wheel 9 with no adverse affect on the steering.

The rider is also able to remove the hands/arms from the handles and the bike would remain stable and moving in the intended direction as the forces from the support pad 1 are equal to both sides of the center of the bicycle. The rider can then use his hands to operate gears or other necessary controls on the cycle.

REFERENCE NUMERALS IN THE DRAWINGS

1 Support pad
2 Post
3 Fork steerer tube
4 Frame
5 Handlebar
6 Stem
7 Front sprocket
8 Front chain/belt
9 Front wheel
10 Fork
11 Rear wheel
12 Rear sprocket
13 Rear chain
14 Foot pedals
15 Seat
16 Clamp
17 Alternative pad

18 Support struts
19 Post clamp
20 Bolt
21 Figure of eight pad

The invention claimed is:

1. A support pad device comprising of a pad with a top surface and a bottom surface, a post of a tubular shape having a first end attached to the pad wherein a second end fits directly inside and on a same axis of a fork steerer tube of a two wheeled cycle, the cycle further comprising:
   a handlebar including a left and a right crank oriented at 0 degrees relative to one another and securely attached to one another,
   a sprocket securely attached to the handlebar,
   a single chain or belt that engages with the sprocket and transfers propulsion to a front wheel from the handlebar capable of completing a full circular motion,
   a stem comprising of a first end having a horizontal tubular bearing surface rotatably connected to the handlebar and a second end securely attached to the fork steerer tube.

\* \* \* \* \*